(12) United States Patent
Kurita et al.

(10) Patent No.: US 6,514,444 B1
(45) Date of Patent: Feb. 4, 2003

(54) METHOD OF MANUFACTURING A MOLDED PLASTIC ARTICLE AND A GLASS MOLDING PLASTICS

(75) Inventors: Teruyoshi Kurita, Suzuka (JP); Ryota Miyata, Suzuka (JP); Masashi Otsuka, Suzuka (JP); Masatsugu Kikuchi, Tsu (JP); Hiroshi Maeda, Hisai (JP)

(73) Assignee: Suzuka Fuji Xerox Co., Ltd., Mie (JP)

(*) Notice: Subject to any disclaimer, the term of this patent is extended or adjusted under 35 U.S.C. 154(b) by 0 days.

(21) Appl. No.: 09/540,487

(22) Filed: Mar. 31, 2000

(30) Foreign Application Priority Data

Apr. 2, 1999 (JP) ............................. 11-096619
Sep. 28, 1999 (JP) ............................. 11-274675
Nov. 25, 1999 (JP) ............................. 11-334715

(51) Int. Cl.$^7$ .................... B29C 33/00; B29D 11/00; C03B 11/00
(52) U.S. Cl. ................ 264/219; 249/57; 264/2.5; 65/47
(58) Field of Search .......................... 264/219, 221, 264/227, 1.9, 2.5; 249/57, 63, 114.1, 117; 65/110, 102, 45, 47

(56) References Cited

U.S. PATENT DOCUMENTS 5,163,989 A * 11/1992 Campbell et al. ............ 264/221
5,171,806 A * 12/1992 Kayanoki et al.

FOREIGN PATENT DOCUMENTS

| JP | 01239030 | 9/1989 | ............ C03B/11/00 |
| JP | 03214115 | 9/1991 | ............ G02B/26/10 |
| JP | 06072727 | 3/1994 | ............ C03B/11/00 |
| JP | 06345464 | 12/1994 | ............ C03B/11/08 |

* cited by examiner

Primary Examiner—Mathieu D. Vargot
(74) Attorney, Agent, or Firm—Cooper & Dunham LLP; Donald S. Dowden

(57) ABSTRACT

The object of the present invention is to provide a molded plastic article having high accuracy. To attain this object, the present invention provides a method of manufacturing a column or panel shaped molded plastic article having a desired molding shape on at least the circumference face of said molded plastic article comprising; manufacturing a column or panel shaped mother mold by using a material having high rigidity and heat resistance, the circumference face of said mother mold has a shape corresponding to the molded shape of the circumference face of said molded plastic article, manufacturing a cylindrical or ring shaped glass mold by the glass molding method, the inside face of which has a shape transferred from said shape of the circumference face of said mother mold, and molding a molded plastic article, circumference face of which as a shape transferred from said shape of the inside face of said resulting glass mold.

11 Claims, 7 Drawing Sheets

METHOD OF MANUFACTURING A MOLDED PLASTIC ARTICLE AND A GLASS MOLDING PLASTICS

FIELD OF THE INVENTION

The present invention relates to a method of manufacturing a molded plastic article and a glass mold for molding plastics.

More particularly, the present invention relates to a method of manufacturing a column or panel shaped molded plastic article having a desired molding shape on at least the circumference face of said molded plastic article comprising; manufacturing a column or panel shaped mother mold by using a material having high rigidity and heat resistance, the circumference face of said mother mold has a shape corresponding to the molded shape of the circumference face of said molded plastic article, manufacturing a cylindrical or ring shaped glass mold by the glass molding method, the inside face of which has a shape transferred from said shape of the circumference face of said mother mold, and molding a molded plastic article, circumference face of which as a shape transferred from said shape of the inside face of said resulting glass mold.

DESCRIPTION OF THE PRIOR ART

Hitherto a mold used for such as the injection molding or the compression molding of plastics and the like or press molding or glass molding is generally made by such as machining, an abrasive finishing of metal and the like.

To manufacture said mold made by manufacturing of metal as above described, a long time and a high expense are necessary. Accordingly, when said mold is used for the production in small amount such as for the trial production of parts, a unit price of parts may become high and it may be difficult to quickly supply said parts to users.

To manufacture said mold in a low expense and in a short time, a method comprising manufacturing a mother model by using a silicone rubber, forming a gypsum casting mold by using said mother mold and casting an alloy having a low melting point in said gypsum casting mold to manufacture a mold has been provided (TOKKO Hei 3-39776, TOKKAI Hei 5-301255, TOKKAI Hei 6-134815). Further, a means to solve the problem of contraction of said mold in said method has been provided (TOKKAI Hei 7-125014).

The facial accuracy of the polygon mirror as an optical element may include the plane accuracy, the inclination of plane from a base plane, the inclination error between faces adjoining respectively, the angle between planes adjoining respectively, the effective range and the like and it is difficult to mold said optical element in accuracy finer than 1 $\mu$m by using said mold manufactured by above decribed method.

To manufacture a mold for parts having high accuracy, it may be necessary to combine a plural number of mold parts since it is difficult to form a cavity having high accuracy in one body excepting the mold for parts having a simple shape. For instance, to manufacture a mold for an optical element having high accuracy, a method of preparing a plural number of core mold parts for each optical face and combining said core mold parts have been provided. To set each core mold part to a fixed possition, guide ditches are formed in said mold in said method.

In said method in which a plural number of said core mold parts are combined together, processing common difference of each core mold part may accumulate such that each core mold part should have very high accuracy. Accordingly a lot of processing time is necessary, resulting in high cost.

The electrodischarge machining method or the electroforming method is a method to manufacture a mold in one body in which combining a plural number of core mold parts is not necessary.

By using said electrodischarge machining method, the accuracy of the resulting shape is rather high but since it is difficult to obtain the necessary surface roughness, the mirror polishing of faces to be optical face of said optical element may be necessary as finishing. Nevertheless, in the mold for manufacturing the optical element having a plural number of optical faces on the circumference face such as the rotating polygon mirror, since the inside face is the mold face which is a finishing face, it is difficult to finish the whole inside face in high accuracy, especially boundary part between the face and the face.

Further, said electroforming method has a probelm that the accuracy of the mold face becomes lower since the strain of electroformed plating layer is released when the master is removed. Although the amount of variation in this case is 1 to a few $\mu$m, said amount of variation quantity may not be in a permitted range. Further, said electroforming method needs a longer time than abrasive finishing of metal.

SUMMARY OF THE INVENTION

Accordingly, an object of the present invention is to manufacture a column or panel shaped molded plastic article with high accuracy.

Another object of the present invention is to manufacture said molded plastic article at a low cost and in a short time.

Further object of the present invention is to provide a mold for a molded plastic article.

Briefly, said object of the present invention can be attained by a method of manufacturing a column or panel shaped molded plastic article having a desired molding shape on at least the circumference face of said molded plastic article comprising; manufacturing a column or panel shaped mother mold by using a material having high rigidity and heat resistance, the circumference face of said mother mold has a shape corresponding to the molded shape of the circumference face of said molded plastic article, manufacturing a cylindrical or ring shaped glass mold by the glass molding method, the inside face of which has a shape transferred from said shape of the circumference face of said mother mold, and molding a molded plastic article, circumference face of which has a shape transferred from said shape of the inside face of said resulting glass mold and a column or panel shaped glass mold used to mold plastics having a desired molding shape on at least its circumference face, said glass mold has a circumference face having a shape euqal to the shape of the circumference face of said molded plastic article and is manufactured by using a column or panel shaped mother mold made of a material having high rigidity and heat resistance and transferring the shape of the circumference face of said mother mold to the inside face of said glass mold.

BRIEF DESCRIPTION OF THE DRAWINGS

FIG. 11 is a side sectional view of a molded glass mold in the second embodiment.

FIG. 12 is a plane view of glass mold in other embodiments.

DETAILED DESCRIPTION

Figure 1:
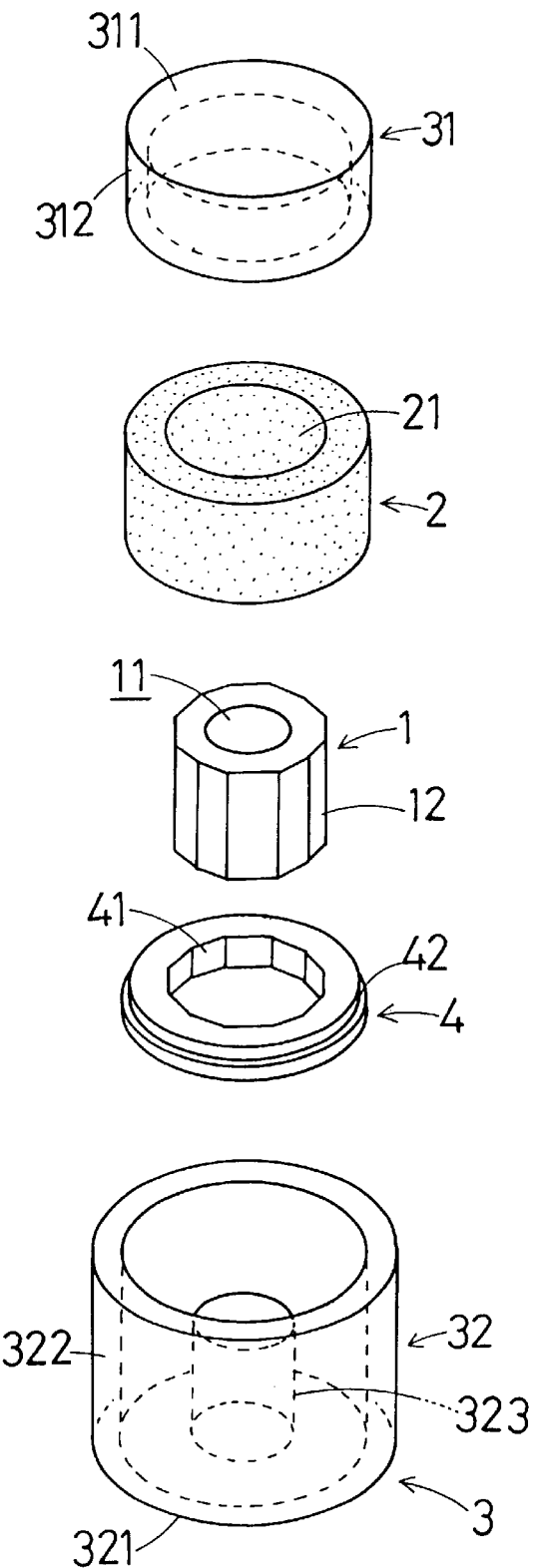
FIG. 1 is a perspective view of the parts used in the first embodiment of molding a glass mold.

The present invention relates to a method of manufacturing a column or panel shaped molded plastic article having a desired molding shape on at least the circumference face of said molded plastic article comprising; manufacturing a column or panel shaped mother mold by using a material having high rigidity and heat resistance, the circumference face of said mother mold has a shape corresponding to the molded shape of the circumference face of said molded plastic article, manufacturing a cylindrical or ring shaped glass mold by the glass molding method, the inside face of which has a shape transferred from said shape of the circumference face of said mother mold, and molding a molded plastic article, circumference face of which has a shape transferred from said shape of the inside face of said resulting glass mold and a column or panel shaped glass mold used to mold plastics having a desired molding shape on at least its circumference face, said glass mold has a circumference face having a shape euqal to the shape of the circumference face of said molded plastic article and is manufactured by using a column or panel shaped mother mold made of a material having high rigidity and heat resistance and transferring the shape of the circumference face of said mother mold to the inside face of said glass mold.

In said method of manufacturing said molded plastic article, since said glass mold having one body structure manufactured by the glass molding method is used, a long time and high cost in the case of a mold made by the machining or the abrasive finishing may not be necessary and further, the accuracy of said glass mold may be much higher than the accuracy of the mold made of the alloy having a low melting point which is manufactured by casting method using the gypsum casting mold model and the master mold of the silicone rubber. Further by using said glass mold, the problem of accumulation of the processing common difference of each core mold part may be solved and the mirror polishing in the electrodischarge machining method may not be necessary and further the problem of the accuracy and the processing time may be solved. As a result, the molded plastics article usable for the rotating polygon mirror as an optical element can be manufactured in low cost and a short time by using said method of the present invention.

Oxygen free copper, nickel alloy, ceramics and the like are used as the material of said mother mold and if necessary, a film may be formed on the surface of said mother mold to control surface roughness and improve affinity with the glass material to be molded, the antioxidation property, and the like. Said film to control surface roughness, namely surface smoothness and improve releasing property for the glass material may include platinum alloy film, carbon film having diamond structure, titanium nitride, chromium oxide, and the like and the film to improve the antioxidation property may include noble metal film and the like.

A glass having a good stability may preferably be used as the material of said glass mold (2A) and said glass mold (2A) may be manufactured by the precision glass molding technique in which an excellent transferring property from the mother model can be attained. Preferable glass to be used as the material of said glass mold may be a glass having a softening point lower than 650° C. and a slowly cooling point and a strain point between 400 and 500° C.

In a preferable method of manufacturing said molded plastic article, said mother mold (1) is set in a receiving mold (32) having a circumference wall (322) and a bottom (321), a tube or ring shaped glass material to be molded (2) is set between said mother mold (1) and the circumference wall (322) of said receiving mold (32), said glass material (2) is heated to softern and pressed vertically by a press mold (31) and as a result, said softened glass material (2) flows radially toward the circumference face (12) of said mother mold (1) to be pressed against the circumference face (12) of said mother mold (1) transferring the shape of the circumference face (12) of said mother mold (1) to the inside face (21) of said glass material (2).

By said method of manufacturing said molded plastic article, the shape of the circumference face (12) of said mother mold (1) can be precisely transferred to the inside face (21) of said glass mold and a glass mold (2A) having high accuracy can be obtained.

It is preferable to set said mother mold (1) in said receiving mold (32) so as to be free vertically. In a case where said mother mold (1) is set in said receiving mold (32) fixing vertically, a glass mold (2A) having the inside face (21) with high accuracy cannot be manufactured since said mother mold (1) expands radially toward out side by thermal expansion because the vertical expansion of said mother mold is destructed and as a result, the circumference face (12) of said mother mold (1) may be distorted. In a case where said mother mold (1) is set in said receiving mold (32) so as to be free vertically, the vertical expansion of said mother mold (1) may not be obstructed and as a result, the distortion of the circumference face (12) of said mother mold (1) may be prevented to obtain a glass mold having the inside face (21) with higher accuracy.

Further, it is preferable to set said mother mold (1) on the center of the bottom (321) of said receiving mold (32) by inserting a first ring spacer (4) having the inside face (41) adjacent to the circumference face (12) of said mother mold (1) between the bottom (321) of said receiving mold (32) and said glass material (2) around said mother mold (1).

In a case where said mother mold (1) is set in said receiving mold (32) so as to be free vertically, when said softened glass material (2) is pressed, said softened glass material (2) flows under said mother mold (1) and as a result, said mother mold (1) may be raised. In a case where said mother mold (1) is raised, it is feared that a boundary part between the circumference face (12) and the bottom of said mother mold (1) is distorted by the pressure of said glass material (2). On the other hand, in a case where said spacer (4) is used, said softened and pressed glass material (2) may flow between the inside face (41) of said spacer (4) and the circumference face (12) of said mother mold (1) to prevent the distortion of a boundary part between the circumference face (12) (lower circumference edge) and the bottom of said mother mold (1) so that a glass mold (2A) having the inside face (21) with high accuracy can be manufactured.

It is preferable that the shape of the inside face (41) of said first spacer (4) corresponds to the shape of the circumference face (14) of said mother mold to prevent the distortion of the lower circumference edge of said mother mold (1).

Further the width W between the inside face (41) of said first spacer (4) and the circumference face (12) of said mother mold (1) is preferably 5 to 50 μm to effectively prevent said softened glass material (2) from flowing under said mother mold (1) and further prevent the distortion of the circumference face (12) of said mother mold (1) by not attaching the circumference face (12) of said mother mold (1) to the inside face (41) of said spacer (4) by thermal expansion.

Still further, the coefficient of linear expansion of said first spacer (4) is preferably equal to or larger than the coefficient of linear expansion of said mother mold to prevent the distortion of the circumference face (12) of said mother mold (1) by not attaching the circumference face (12) of said mother mold (1) to the inside face (41) of said spacer (4) by thermal expansion and obtain a glass mold (2A) having the inside face (21) with high accuracy.

Oxygen-free copper, nickel alloy, ceramics, hard metal and the like may be used as the material of said first spacer (4), the same as said mother mold (1).

In said method of manufacturing a molded plastic article, the radial flow of said softened glass material (2) toward inside can be promoted by pressing the outer part of the upper face of said glass material (2) by said press mold (31) to obtain a glass mold (2A) having higher accuracy since the shape of the circumference face (12) can be transferred to the inside face (21) of said glass mold (2A) more precisely.

In the present invention, the second spacer (7) having a coefficient of linear expansion substantialy equal to the coefficient of said first spacer (4) may be set between said press mold (31) and said glass material (2) and the shape and the size of said second spacer (7) is preferably equal to the shape and the size of said first spacer (4).

Anviloy (W—Ni—Mo—Fe sintered alloy) having a smaller coefficient of linear expansion than the coefficient of linear expansion of the glass at the molding temperature and cooling temperature is generally used as a material of said press mold (31) to improve the releasing property from said glass material (2). On the other hand, oxygen-free copper is used as the material of said first spacer (4) having a larger coefficient of linear expansion than the coefficient of linear expansion of the glass. Specifically, the coefficient of linear expansion of the glass at 610° C. is $9.1 \times 10^{-6}$, the coefficient of linear expansion of anviloy at 610° C. is $4.53 \times 10^{-6}$, and the coefficient of linear expansion of exygen-free cupper at 610° C. is $20.3 \times 10^{-6}$.

Accordingly the coefficient of linear expansion of the first spacer (4) attaching to the lower face of said glass material (2) is larger than the coefficient of linear expansion of said glass material (2) and the shrinkage rate of said first spacer (4) is also larger than the shrinkage rate of said glass material during cooling of the molded glass material while the coefficient of linear expansion of said press mold (31) attaching to the upper face of said glass material (2) is smaller than the coefficient of linear expansion of said glass material (2) and the shrinkage rate of said press mold (31) is also smaller than the shrinkage rate of said glass material (2) and as a result, the shrinkage rate of the upper face and the shrinkage rate of the lower face of said glass material (2) are different from each other being effected by said first spacer (4) and said press mold (31). Accordingly it is feared that the inside face (21) of the resulting glass mold radially inclines toward inside from the bottom to the top, resulting in the low vertical face accuracy.

In a case where said second spacer (7) is set between said press mold (31) and said glass material (2), the shrinkage rate of the upper face and the lower face of said glass material during cooling may be substantially equal wherein said second spacer (7) has a coefficient of linear expansion substantially equal to the coefficient of linear expansion of said first spacer (4) so that the shrinkage rate of said second spacer (7) is substantially equal to the shrinkage rate of said first spacer (4). As a result, the vertical face accuracy of the inside face (21) of the resulting glass mold (2B) is improved by using said second spacer (7) besides said first spacer (4).

Said molded plastic article of the present invention may be a polygon mirror (5) having a plural number of reflecting faces on its circumference face (51) and by the above described method of the present invention, a polygon mirror (5) having high optical accuracy can be manufactured.

Further, the present invention also provides a column or panel shaped glass mold (2A, 2B) used to mold plastics having a desired molding shape on at least its circumference face (51), said glass mold (2A, 2B) has a circumference face (12) having a shape euqal to the shape of the circumference face (51) of said molded plastic article (5) and is manufactured by using a column or panel shaped mother mold (1) made of a material having high rigidity and heat resistance and transferring the shape of the circumference face (12) of said mother mold (1) to the inside face of said glass mold (21).

Since said glass mold (2A, 2B) used to mold plastics has one body structure manufactured by the glass molding method, a long time and high cost are not necessary unlike the case of the machining and the abrasive finishing of metal, the problem of a low accuracy is effectively solved unlike the case of the rubber mold, the gypsum casting mold, and the mold made of alloy having a low melting point, the problem of accumulation of processing common difference in the case of the combination of the plural number of the optical core mold parts is also effectively solved, the mirror polishing as finishing is also not necessary unlike the case of the electrodischarge machining method, and the problem of accuracy and the processing time is also solved unlike the case of the electroforming method. Said glass mold (2A, 2B) used to mold plastics can be manufactured in low cost and a short time and by using said glass mold, a molded plastic article (5) having high accuracy and usable as the rotating polygon mirror which is an optical element can be manufactured.

An adjusting part (24) such as adjusting face, adjusting pin, adjusting pin hole, adusting ditch, and the like may be formed on a fixed part excepting the mold face of said glass mold to adjust the setting position of said glass mold (2C) in a plastic molding unit (6) for molding plastics. Said adjusting part (24) may be formed during molding said glass mold or after molding.

By forming said adjusting part (24) on said glass mold (2C), said glass mold (2C) may be easily set on a fixed position in said plastic molding unit (6) to obtain molding accuracy of the resulting molded plastic article (5).

A coating film may be formed on at least mold face of said glass mold (2A, 2B, 2C) to improve the property of the surface. Said coating film may control the surface roughness of the mold face of said glass mold (2A, 2B, 2C) physical properties relating to the affinity of the mold face with the plastic material to be molded and chemical properties and further improves the antioxidation property.

Platinum alloy, carbon film having diamond structure, titanium nitride, chrominium oxide and the like are used as said coating film to improve the smoothness of the mold face and the releasing property for the plastic material and a noble metal film and the like are used as said coating film to improve the antioxidation property.

EMBODIMENTS

Figure 5:
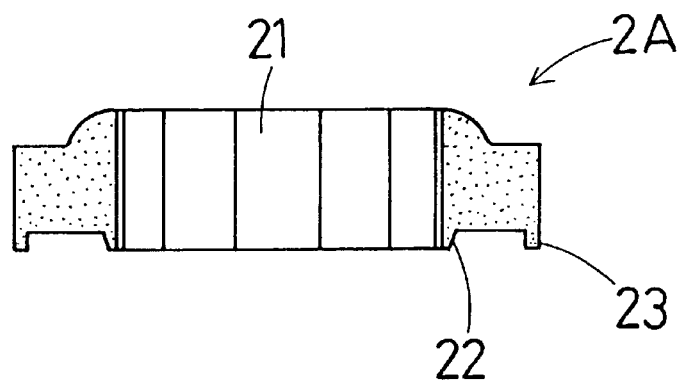
FIG. 5 is a side sectional view of a molded glass mold in the first embodiment.
Figure 6:
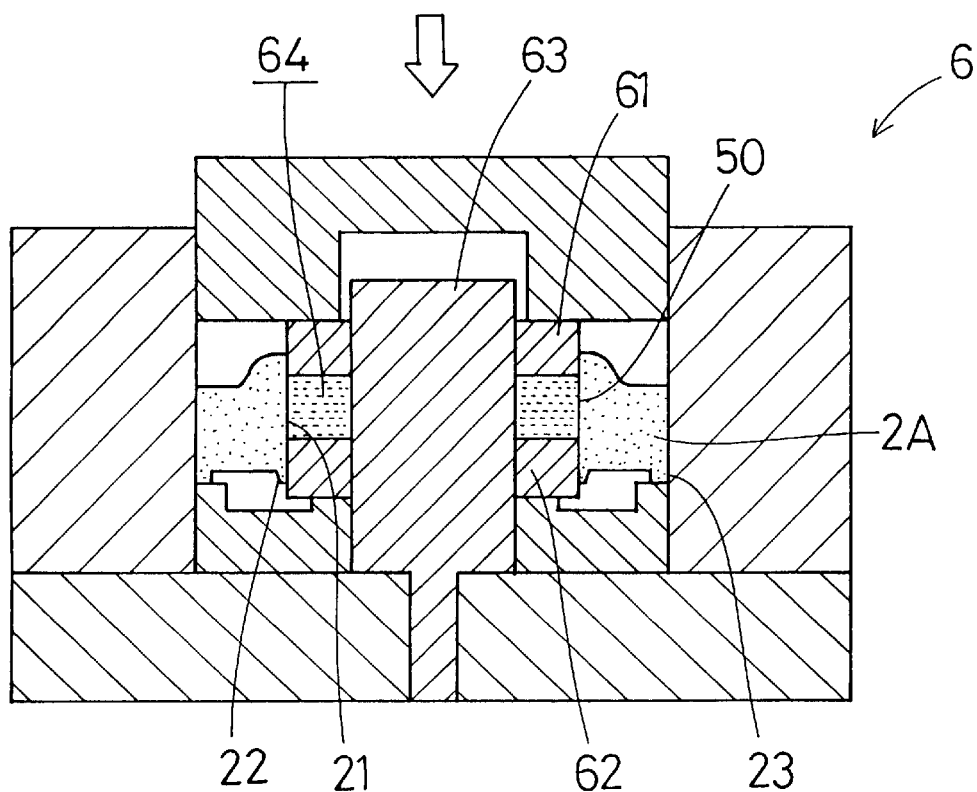
FIG. 6 is a side sectional view to illustrate the situation of the injection molding of a rotating polygon mirror.
Figure 7:
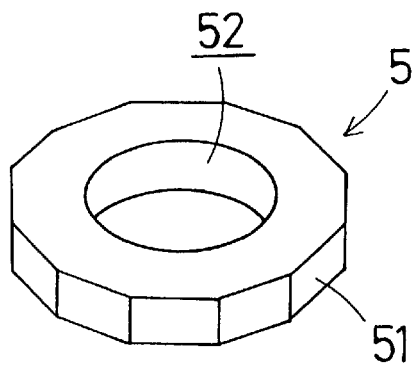
FIG. 7 is a perspective view of the molded rotating polygon mirror.

FIG. 1 to FIG. 7 relate to the first embodiment of the present invention. This embodiment relates to manufacturing a rotating dodecagon mirror (5) made of a plastics having distance between the face and the face opposing to each other 25 mm, thickness 5 mm and diameter of mother axle hole 10 mm$\phi$ as shown in FIG. 7.

In this embodiment, a mother mold (1), a glass material to be molded (2), a mold for glass molding (3) and a spacer (4) are respectively prepared as shown in FIG. 1.

Said mother mold (1) is formed in the shape of the regular dodecagonal column equal to the shape of the objective rotating polygon mirror and a core pin hole (11) is formed at the center of said mother mold (1). The material of said mother mold (1) in this embodiment is oxygen-free copper and said mother mold is manufactured by the precise lathe and the distance between the face and the face opposing to each other is about 25 mm, the hight is about 15 mm, and the diameter of core pin hole (11) is 16 mm$\phi$ in said mother mold (1). These sizes are precisely decided considering shrinkage rates of the glass material used for said glass mold (2) and the plastic material used for said rotating polygon mirror (5).

Said glass material (2) is formed in the cylindrical shape having an inside diameter in which said mother mold (1) can be inserted. Said glass material (2) in this embodiment is made of a glass, the melting point of which is about 650° C. (for instance SK11, Shot Co.) and the outer diameter is 65.0 mm$\phi$, the inner diameter is about 26.5 mm$\phi$, and the hight is 8 mm. Surface roughness of the inside face of said glass material (2) is finished with P–V=0.2 $\mu$m.

A mold for glass molding (3) in this embodiment consists of a press mold (31) and a receiving mold (32) and said press mold (31) consists of a circular upper plate (311) and a cylindrical part (312) extending downward from said upper plate (311) and said receiving mold (32) consits of a circular bottom (321), a circumference wall (322) extending upward from said bottom (321), and a columnar core pin (323) standing from the center of said bottom (321).

The inner diameter of the circumference wall (322) of said receiving mold (32) is set to be a little longer than the outer diameter of said glass material (2) and the diameter of the core pin (323) of said receiving mold (32) is set to be a little smaller than the diameter of the core pin hole (11). Further the outer diameter of the cylindrical part (321) of said press mold (3) is set to be a little smaller than the inner diameter of the circumference wall (322) of said receiving mold (32) and the inner diameter of the cylindrical part (321) of said press mold (31) is set to be between the outer diameter and the inner diameter of said glass material (2). Said mold (3) for glass molding is made of W—Ni—Mo—Fe sintered alloy which is a hard metal.

Said spacer (4) in this embodiment is ring shaped and the outer diameter of said spacer (4) is set to be a little smaller than the inner diameter of the circumference wall (322) of said receiving mold (32) and the plane shape of the inside face (41) of said spacer (4) is dodecagon so as to correspond to the shape of the circumference face (12) of said mother mold (1). The width W between the inside face (41) of said spacer (4) and the circumference face (12) of said mother mold (1) is set to be 10 $\mu$m as shown in FIG. 3 and a gained part (42) is formed on the upper circumference edge of said spacer (4).

The material of said spacer (4) of this embodiment is oxygen-free copper, the same as said mother mold so that the coefficient of linear expansion of said spacer (4) is set to be equal to the coefficient of linear expansion of said mother mold (1). An ultrared ray lamp is used for heating and nitrogen gas is used for cooling for a press machine used in this embodiment (not shown in figures) (maximum pressure 19.6 kN).

Figure 2:
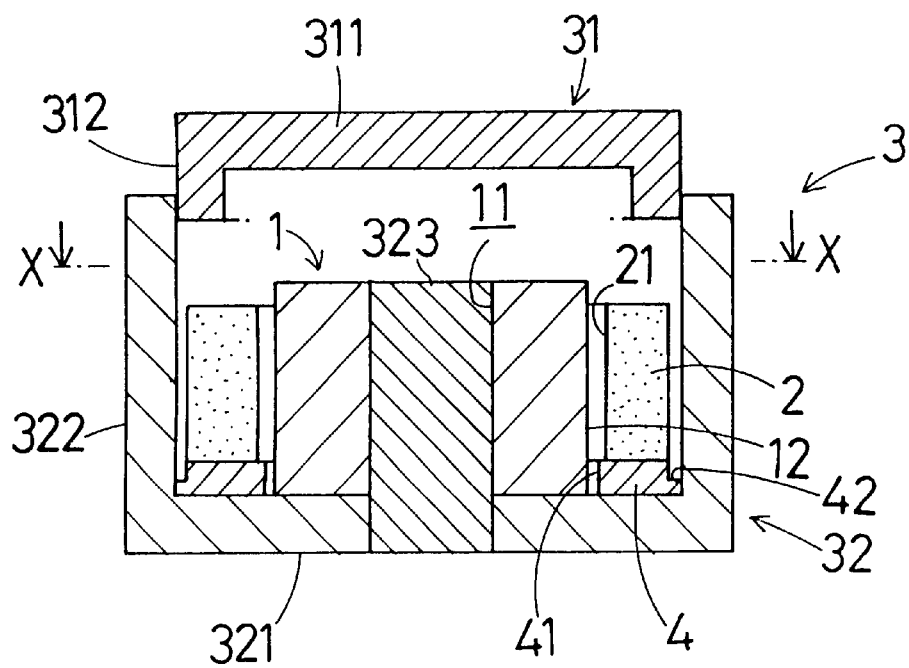
FIG. 2 is a side sectional view to illustrate the situation before molding glass mold in the first embodiment.
Figure 3:
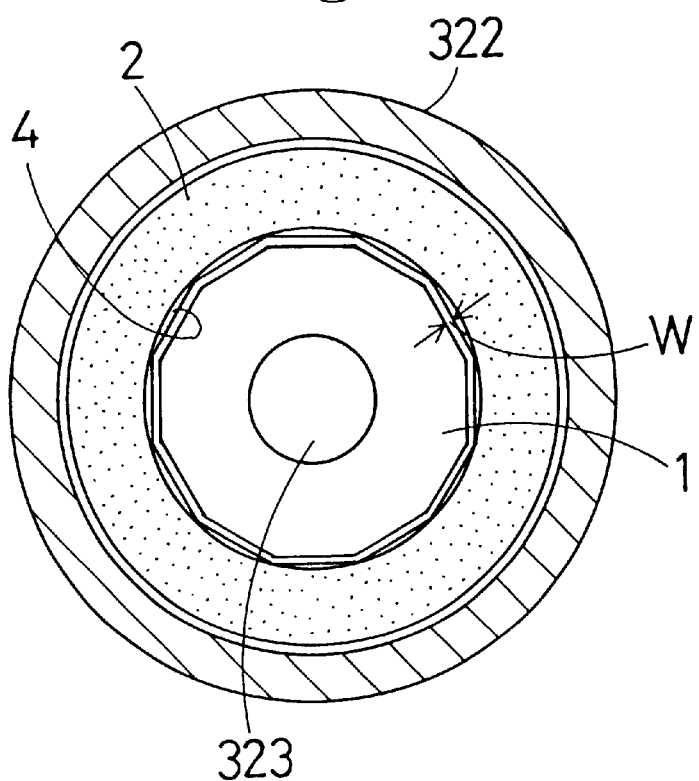
FIG. 3 is a sectional view cut along X—X of the glass molding of FIG. 2.

Said mold (3) for glass molding is set on the die plate of said press machine and then said mother mold (1), said spacer (4) and said glass material (2) are respectively set in said receiving mold (32) of said mold (3) as shown in FIGS. 2 and 3. Said core pin (323) is inserted into the core pin hole (11) of said mother mold (1) to be set in said receiving mold (32) so as to be free vertically, namely vertically slidable and said spacer (4) is set wherein the space having a width W is formed between the inside face (41) of said spacer (4) and the circumference face (12) of said mother mold (1) and then said glass material (2) is set on said spacer (4).

Said mold for glass molding (3) in which said mother mold (1), said spacer (4) and said glass material (2) are respectively set is put under nitrogen gas atmosphere and heated up to about 650° C. and then said glass material (2) is pressed by pushing down said press mold (31) of said mold (3) into said receiving mold. Pressure of said press mold (31) is set to be about 294 N and pressing time is about 3 minutes.

Figure 4:
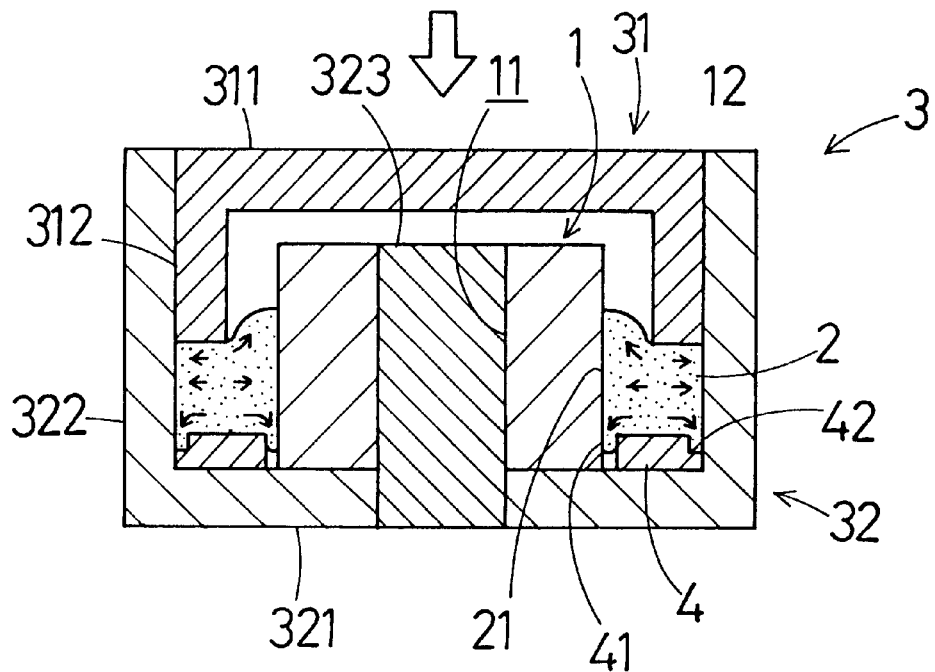
FIG. 4 is a side sectional view to illustrate the situation of molding glass mold in the first embodiment.

Said softened glass material (2) by heating is transformed to contract its thickness and flows horizontally (radially) by said vertical pressure as shown by arrows in FIG. 4 so that the inside face (21) of said glass material (2) is pressed against the circumference face (12) of said mother mold (1). Further the lower part of the inside face (21) of said glass material (2) enters between the circumference face (12) of said mother mold (1) and the inside face (41) of said spacer (4) and the inner part of the upper face of said glass material (2) (the inner side of the part of the upper face pressed by said press mold (31)) rises upward. At the same time the lower circumference edge of said glass material (2) enters between the inside face of the circumference wall (322) of said receiving mold (32) being set in said mold (3) and the gained part (42) of said spacer (4).

Since said mother mold (1) is vertically movable, said mother mold (1) expands vertically by heating to prevent the distortion of the circumference face (12) of said mother mold (1) which may be caused by vertical fixing. Further said spacer (4) obstructs the flow of said softened glass material under said mother mold (1) and as a result, the distortion of the lower circumference edge of said mother mold (1) is prevented. Accordingly said mother mold (1) can keep the accurate shape of the circumference face (12).

Since the outer part of upper face of said glass material (2) is pressed by said press mold (31), said glass material (2) flows radially toward the circumference face (12) of said mother mold rather than flows towards the inside face of the circumference wall (322) of said receiving mold (32) and the radial flow toward inside is promoted so that an uniform high pressure is effected against the inside face (21) of said glass material (2).

As above described, the inside face of said glass material (2) contacts closely to the circumference face (12) of said mother mold (1) to transfer the shape of circumference face (12) of said mother mold (1) precisely to the inside face (21) of said glass material (2). As a result, a glass mold (2A) having the inside face (21) with high accuracy is obtained.

Especially in a case where the circumference face (12) of said mother mold has a polygon shape as in this embodiment, an uniform high pressure is effected against the inside face (21) of said glass material (2), and as a result the corner of the polygon shape is pushed out smoothly to transfer the polygon shape of the circumference face (12) of said mother mold (1) to the inside face (21) of said glass material (2) in a sharp shape with high accuracy.

After said press molding as above described, said molded glass material (2) is gradually cooled at a cooling speed of 0.05° C./second down to 600° C. and further cooled down to 200° C. to complete the molding of the glass mold (2A). Said glass mold (2A) is taken out from said mold (3) and the transferring accuracy of the shape of the inside face (21) from the polygon shape of the circumference face (12) of said mother mold (1) is about 100% as shown in FIG. 5 and necessary accuracies (plane accuracy 0.15 μm (vertically: 0.05 μm), inclination of plane: 45 seconds, angle error between adjoining faces : ±15 seconds) are ensured in said glass mold (2A). Namely, the plane accuracy as the shape accuracy of each unit face (2 mm×6 mm) of the inside face (21) (mold face) is finer than 0.15 μm (vertically: 0.05 μm) so that all unit faces of said inside face (21) have enough plane accuracy of finer than 0.15 μm (vertically: 0.05 μm).

Further the flash (22) is slightly formed at the lower end of the inside face (21) of said glass mold (2A) and a projecting edge part (23) is formed at the lower circumference edge of said glass mold (2A) corresponding with the gained part (42) of said spacer (4).

Said resulting glass mold (2A) is set in said plastic molding unit (6) as shown in FIG. 6 and a cavity (64) is formed, said cavity (64) is surrounded by the inside face (21) of said glass mold (2A), the lower face of an upper mold unit (61) and the upper face of a lower mold unit (62) set in said glass mold (2A) as shown in FIG. 6, and the circumference face of a core mold unit (63) set in said upper mold unit (61) and said lower mold unit (62), and further a ring made of a thermoplastic resin material (50) such as polycarbonate is set in said cavity (64).

Since said glass mold (2A) is supported by said projecting edge part (32) in said plastics molding unit (6), trimming of the flash (22) formed at the lower end of the inside face (21) of said glass mold (2A) is not necessary.

After setting said plastic molding unit (6) as above described, said plastic molding unit (6) is heated at a temperature higher than the softening temperature of the thermoplastic resin material of said ring (50) and said softened ring (50) is pressed between said upper mold unit (61) and said lower mold unit (62) by pushing down said upper mold unit (61) by the press machine to transfer the shape of said cavity (64) to said ring (50).

After cooling the resulting molded plastic article, a rotating polygon mirror (5), is taken out from the cavity (64) of said plastic molding unit (6) and the circumference face (51) is a dodecagon shaped reflecting face and a mother axle hole (52) is formed in the center of said rotating polygon mirror (5). Said rotating polygon mirror (5) has a predetermined size, namely the distance between the face and the face opposing to each other is 25 mm, the thickness is 5 mm and the diameter of the motor axle hole (52) is 10 mmϕ.

Especially, the transfer accuracy of the shape of the circumference face (51) of said rotating polygon mirror (5) from the polygon shaped inside face (21) of said glass mold (2A) is about 100% and necessary accuracies (plane accuracy: 0.15 μm (vertically: 0.05 μm), inclination of face: 45 seconds, angle error between the adjoining faces: ±15 second) are ensured. Namely the plane accuracy of the circumference face (51) of said rotating polygon mirror (5) is finer than 0.15 μm (vertically: 0.05 μm) for unit face (2 mm×5 mm) and each unit face of the circumference face (51) has respectively an enough plane accuracy of finer than 0.15 μm (vertically 0.05 μm ).

Next, FIG. 8 to FIG. 11 relate to the second embodiment of the present invention. This embodiment relates to manufacturing a rotating dodecagon mirror (5) made of a plastic having distance between the face and the face opposing to each other 25 mm, thickness 5 mm and the diameter of motor axle hole 10 mmϕ as shown in FIG. 7.

Figure 8:
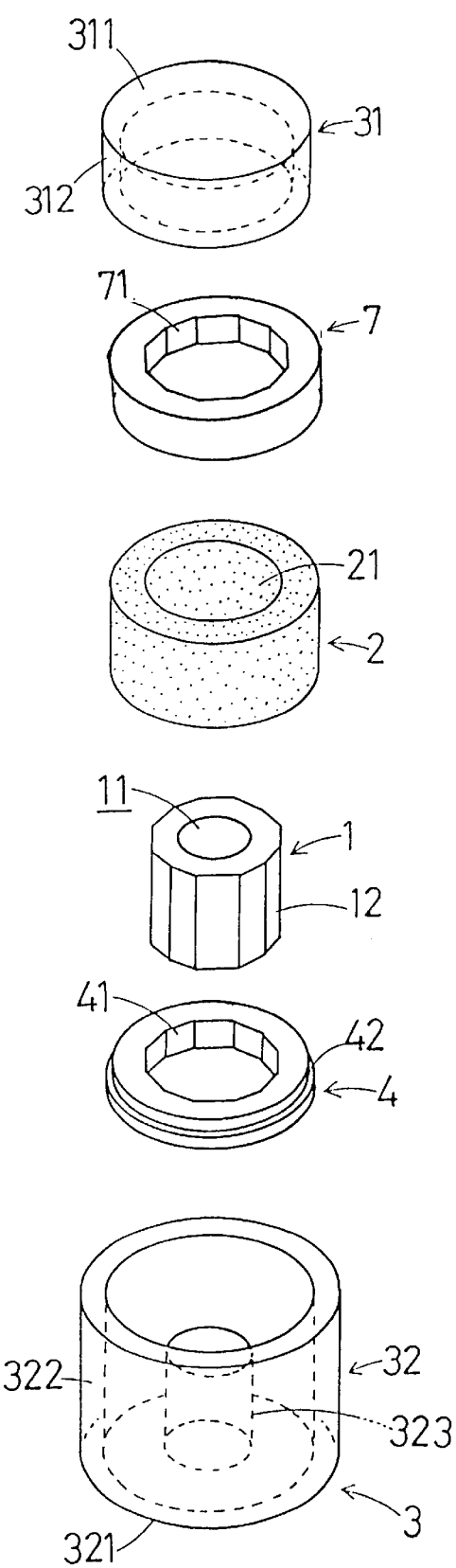
FIG. 8 is a perspective view of the parts used in the first embodiment of molding a glass mold.

In this embodiment, a mother mold (1), a glass material to be molded (2), a mold for glass molding (3), a first spacer (4) and a second spacer (7) are respectively prepared as shown in FIG. 8. Said mother mold (1), said glass material to be molded (2), said mold for glass molding (3) and said first spacer 4 to be used in this embodiment are the same as ones used in the first embodiment.

Said second spacer (7) is ring shaped and the outer diameter of said second spacer (7) is set to be a little smaller than the inner diameter of the circumference wall (322) of said receiving mold (32) and the plane shape of the inside face (71) of said second spacer (7) is dodecagon so as to correspond to the shape of the circumference face (12) of said mother mold (1). The width W between the inside face (71) of said second spacer (7) and the circumference face (12) of said mother mold (1) are set to be 10 μm.

The material of said second spacer (7) is oxygen-free copper the same as said first spacer (4) so that the coefficient of liner expansion of said second spacer (7) is set to be equal to the coefficient of liner expansion of said first spacer (4).

Figure 9:
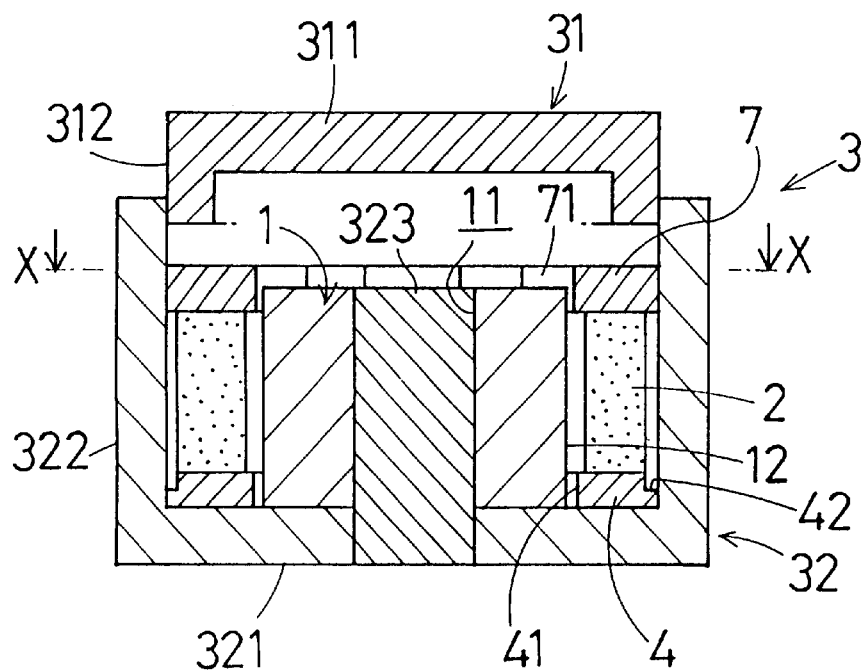
FIG. 9 is a side sectional view to illustrate the situation before molding glass mold in the second embodiment.

Said mother mold (3) for glass molding is set on the die plate of said press machine and then said mother mold (1), said first spacer (4) and said glass material (2) are respectively set in said receiving mold (32) of said mold (3) as shown in FIG. 9 in the same way as being done in the first embodiment, and said second spacer (7) is set wherein the space having a width W is formed between the inside face (71) of said second spacer (7) and the circumference face (12) of said mother mold (1). Also, the upper half of said second spacer (7) projects from the upper face of said mother mold (1).

Said mold for glass molding (3) in which said mother mold (1), said first spacer (4), said second spacer (7) and said glass material (2) are respectively set is heated and then said glass material (2) is pressed in the same way as being done in the first embodiment.

Figure 10:
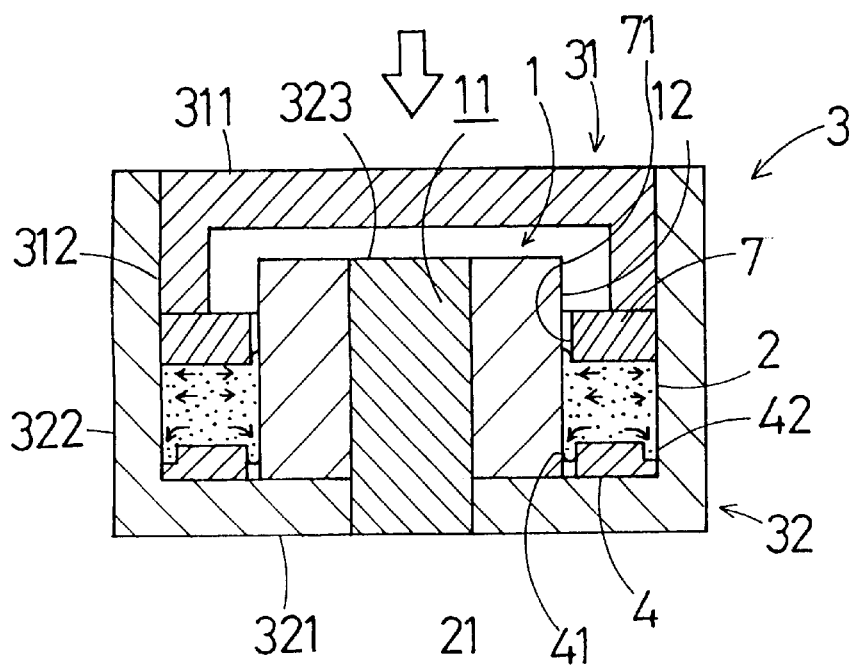
FIG. 10 is a side sectional view to illustrate the situation of molding glass mold in the second embodiment.
Figure 1:
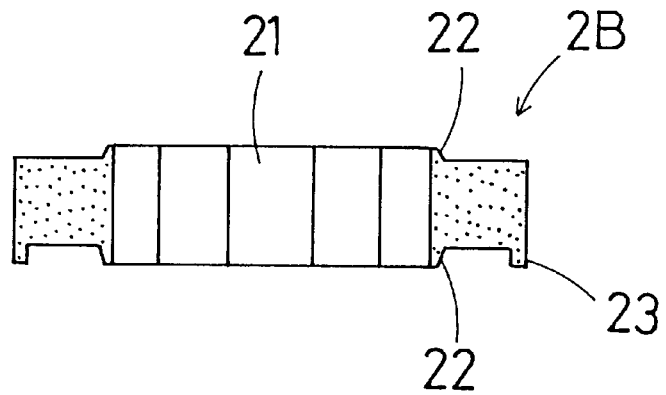
Figure 1:
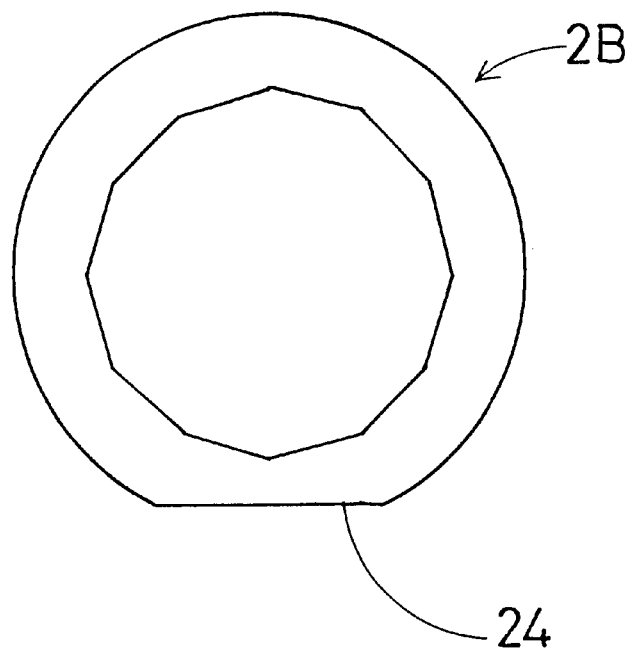

Said softened glass material (2) by heating is transformed to contract its thickness and flows radially as shown by arrows in FIG. 10 so that the inside face (21) of said glass material (2) is pressed against the circumference face (12) of said mother mold (1). Further the lower part of the inside face (21) of said glass material (2) enters between the circumference face (12) of said mother mold (1) and the inside face (41) of said first spacer (4). At the same time the inner part of the upper face of said glass material (2) enters between the circumference face (12) of said mother mold (1) and the inside face (71) of said second spacer (7).

After said press molding as above described, said molded glass material (2) is gradually cooled at a cooling speed of 0.05° C./second down to 600° C. and further cooled down to 200° C. to complete the molding of the glass mold (2A).

In this case the shrinkage rate of the lower face of said glass material (2) attaching to said first spacer (4) is equal to the shrinkage rate of the upper face of said glass material (2) attaching to said second spacer (7) since these both spacers have the same shrinkage rate and the same coefficient of liner expansion during cooling. As a result, high vertical face accuracy of the inside face (21) of the resulting glass mold (2B) is obtained.

Said glass mold (2B) is taken out from said mold (3) and the transferring accuracy of the shape of the inside face (21) from the polygon shape of the circumference face (21) of said mother mold (1) is about 100% as shown in FIG. 11 and necessary accuracies (plane accuracy 0.0904 μm (vertically: 0.02 μm), inclination of plane: 45 seconds, angle error between an adjoining faces: ±15 second) are ensured in said glass mold (2B). Namely, the plane accuracy as the shape accuracy of each unit face (2 mm×6 mm) of the inside face (21) (mold face) is finer than 0.0904 μm (vertically: 0.02 μm) so that all unit faces of said inside face (21) have enough plane accuracy of finer than 0.0904 μm (vertically: 0.02 μm).

Further the flash (22) is slightly formed at the lower and the upper ends of the inside face (21) of said glass mold (2B).

Using the glass mold (2B) formed as above described, a rotating polygon mirror (5B) is formed as similar to the case of said first embodiment. The transfer accuracy of the shape of the circumference face (51) of the formed rotating polygon mirror (5) from the polygon shape d inside face (21) of said glass mold (2B) is about 100% and necessary accuracies (plane accuracy: 0.0904 μm (vertically : 0.02 μm), inclination of face: 45 seconds, angle error between the adjoining faces and the face together: ±15 seconds) are ensured. Namely the plane accuracy of the circumference face (51) of said rotating poplygon mirror (5) is finer than 0.0904 μm (vertically: 0.02 μm ) for unit face (2 mm×5 mm) and each unit face of the circumference face (51) has respectively enough plane accuracy of finer than 0.0904 μm (vertically 0.02 μm ).

A method of manufacturing a rotating polygon mirror described in the first and the second embodiments makes it possible for a formed mother mold made of a material having high rigidity and heat resistance to ensure predetermined accuracy. And as shaped not to be under-cut shape, this method can be used not only in a case of a rotating polygon mirror, but also in a case of various molded plastic articles, especially an optical element and other molded plastic articles having high accuracy. And such a molded plastic article having high accuracy can be manufactured at low cost and in a short time.

Said embodiment is shown as an example for explanation and this invention is not limited to such an embodiment. It is possible to add something to or change this embodiment unless such addition or change is contrary to a technical idea of this invention recognized by the expert based on the detailed description of the invention and drawings.

For example, an adjusting face (24) to adjust the setting the position of the molding unit (6) may be formed on the outside of the glass mold (2C) as shown in FIG. 12. By forming said adjusting face (24), said glass mold (2C) may be easiliy set at a fixed position in said plastic molding unit (6) to obtain molding accuracy of the resulting molded rotating polygon mirror (5).

By shaping corresponding to said inside face of a circumference wall (322) of a receiving mold (32) of glass molding (3), such adjusting face (24) and said glass mold (2C) are formed at the same time.

This invention, a method of manufacturing a molded plastic article and a glass mold for molding a plastic article enables to manufacture a column or panel shaped molded plastic article having high accuracy at low cost.

We claim:

1. A method of manufacturing a column or panel shaped molded plastic article having a desired molding shape on at least the circumference face of said molded plastic article comprising: manufacturing a column or panel shaped mother mold by using a material having high rigidity and heat resistance, the circumference face of said mother mold having a shape corresponding to the molded shape of the circumference face of said molded plastic article, manufacturing a cylindrical or ring shaped glass mold by press molding glass material around the circumference face of the mother mold, the inside face of which has a shape transferred from said shape of the circumference face of said mother mold, and molding a molded plastic article having a circumference face shape transferred from said shape of the inside face of said resulting glass mold.

2. A method of manufacturing a molded plastic article in accordance with claim 1, wherein said mother mold is set in a receiving mold having a circumference wall and a bottom, a tube or ring shaped glass material to be molded is set between said mother mold and the circumference wall of said receiving mold, said glass material is heated to soften and pressed vertically by a press mold and as a result said softened glass material flows radially toward the circumference face of said mother mold to be pressed against the circumference face of said mother mold transferring the shape of the circumference face of said mother mold to the inside face of said glass material.

3. A method of manufacturing a molded plastic article in accordance with claim 2, wherein said mother mold is set in said receiving mold so as to be free vertically.

4. A method of manufacturing a molded plastic article in accordance with claim 2, wherein said mother mold is set on the center of the bottom of said receiving mold, a first ring spacer having the inside face adjacent to the circumference face of said mother mold is inserted between the bottom of said receiving mold and said glass material around said mother mold.

5. A method of manufacturing a molded plastic article in accordance with claim 4, wherein the shape of the inside face of said first spacer is corresponding to the shape of the circumference face of said mother mold.

6. A method of manufacturing a molded plastic article in accordance with claim 4, wherein the width of the space between the inside face of said first spacer and the circumference face of said mother mold is between 5 to 50 μm .

7. A method of manufacturing a molded plastic article in accordance with claim 4, wherein the coefficient of linear expansion of said first spacer is equal to or larger than the coefficient of linear expansion of said mother mold.

8. A method of manufacturing a molded plastic article in accordance with claim 2, wherein the outer part of the upper face of said glass material is pressed by said press mold to promote the radial flow of said softened glass material toward the circumference face of said mother mold.

9. A method of manufacturing a molded plastic article in accordance with claim 4, wherein a secondary spacer having the coefficient of linear expansion substantially equal to the coefficient of linear expansion of said first spacer is inserted between said press mold and said glass material.

10. A method of manufacturing a molded plastic article in accordance with claim 1, wherein said molded plastic article is a rotating polygon mirror having a plural number of reflection faces in its circumference face.

11. A glass mold used to mold plastics having a desired molding shape on at least its circumference face, said glass mold having an inside having a shape equal to the shape of the circumference face of said molded plastic article and being manufactured by using a column or panel shaped mother mold made of a material having high rigidity and heat resistance and transferring the shape of the circumference face of said mother mold to the inside face of said glass mold, and by press molding glass material around the circumference face of said mother mold, wherein an adjusting part to adjust the setting position of said glass mold in a plastic molding unit is formed on a fixed part of said glass mold excluding the mold face thereof.

* * * * *